US012746104B2

(12) United States Patent
Taylor et al.

(10) Patent No.: US 12,746,104 B2
(45) Date of Patent: Sep. 29, 2026

(54) GASKET FOR AN ORAL INSERT-HANDLE INTERFACE

(71) Applicant: Fresh Health Inc., Mountain View, CA (US)

(72) Inventors: Machiko Taylor, Alameda, CA (US); Rafael Ramirez, Mountain View, CA (US)

(73) Assignee: Fresh Health Inc., Mountain View, CA (US)

( * ) Notice: Subject to any disclaimer, the term of this patent is extended or adjusted under 35 U.S.C. 154(b) by 0 days.

(21) Appl. No.: 19/210,633

(22) Filed: May 16, 2025

(65) Prior Publication Data

US 2026/0060790 A1 Mar. 5, 2026

Related U.S. Application Data

(60) Provisional application No. 63/649,041, filed on May 17, 2024.

(51) Int. Cl.
*A61C 17/22* (2006.01)

(52) U.S. Cl.
CPC .................................. *A61C 17/227* (2013.01)

(58) Field of Classification Search
CPC ............ A61C 17/0202; A61C 17/0211; A61C 17/0217; A61C 17/022; A61C 17/024; A61C 17/22
See application file for complete search history.

(56) References Cited

U.S. PATENT DOCUMENTS

| | | | | |
|---|---|---|---|---|
| 2,701,147 | A * | 2/1955 | Summerville | F16L 37/088 285/244 |
| 3,315,971 | A * | 4/1967 | Sakurada | F16L 17/032 277/625 |
| 3,469,863 | A * | 9/1969 | Riester | F16L 37/56 285/379 |
| 3,731,675 | A * | 5/1973 | Kelly | A61C 17/0211 601/164 |
| D289,078 | S * | 3/1987 | Vassallo | D23/269 |
| D685,891 | S * | 7/2013 | Williams | D23/269 |
| 9,308,064 | B2 * | 4/2016 | Binner | A61B 5/097 |
| 11,425,994 | B2 * | 8/2022 | Laurent | A46B 15/0012 |
| 12,186,148 | B2 * | 1/2025 | Taylor | A61C 17/228 |
| 2017/0056143 | A1 * | 3/2017 | Hyun | A61C 17/024 |
| 2021/0085436 | A1 * | 3/2021 | Evans | A61C 17/0211 |
| 2024/0197453 | A1 * | 6/2024 | Taylor | A61C 17/38 |
| 2025/0082449 | A1 * | 3/2025 | Taylor | A61C 17/38 |

* cited by examiner

*Primary Examiner* — Ralph A Lewis
(74) *Attorney, Agent, or Firm* — Van Pelt, Yi & James LLP

(57) ABSTRACT

An oral health device includes an oral insert and a fluid delivery system. The oral insert includes a plurality of manifolds for conveying fluids to nozzles in the oral insert. The fluid delivery system includes an interface that mates with the oral insert. The interface includes a gasket having variable stiffness. The gasket has a greater stiffness on a portion proximal to the fluid delivery system than a portion distal to the fluid delivery system.

20 Claims, 13 Drawing Sheets

GASKET FOR AN ORAL INSERT-HANDLE INTERFACE

CROSS REFERENCE TO OTHER APPLICATIONS

This application claims priority to U.S. Provisional Patent Application No. 63/649,041 entitled GASKET FOR AN ORAL INSERT-HANDLE INTERFACE filed May 17, 2024 which is incorporated herein by reference for all purposes.

BACKGROUND OF THE INVENTION

An oral health device may include a fluid reservoir, a pump, and an oral insert. The oral insert includes a plurality of manifolds and a plurality of fluid nozzles. Fluid is introduced into the fluid reservoir. A user may insert the oral insert into their mouth and subsequently turn on the oral health device. The plurality of fluid nozzles is located at locations customized to the oral anatomy of the user. When the oral health device is turned on, the pump causes pressurized fluid to exit the fluid reservoir and to be directed towards the oral anatomy of the user via the plurality of manifolds and the plurality of fluid nozzles.

The oral insert is coupled to the fluid reservoir via a handle. The handle includes a motor and a manifold switch. The manifold switch is configured to rotate and select one of manifolds of the oral insert to which the pressurized fluid is to be provided. The selected manifold and associated fluid nozzles are configured to receive the pressurized fluid and direct the pressurized fluid towards a portion of the user's oral anatomy.

The oral insert is coupled to the handle via a coupling mechanism (e.g., bayonet mechanism, screw-on mechanism, etc.). A quality seal is needed at the oral insert and the handle interface to prevent the oral health device from leaking.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; and a composition of matter. In this specification, these implementations, or any other form that the invention may take, may be referred to as techniques. In general, the order of the steps of disclosed processes may be altered within the scope of the invention. Unless stated otherwise, a component such as a processor, a controller, or a memory described as being configured to perform a task may be implemented as a general component that is temporarily configured to perform the task at a given time or a specific component that is manufactured to perform the task. As used herein, the term 'processor' or 'controller' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A gasket for an oral insert-handle interface is disclosed. The ability of a gasket at the oral insert-handle interface to prevent the oral health device from leaking depends on a hardness associated with the gasket. A gasket having a hardness that is less than a threshold hardness (i.e., the gasket is too soft) may not prevent the oral health device from leaking at the oral insert-handle interface. A gasket having a hardness that that is greater than the threshold hardness (i.e., the gasket seal is too hard) may be too stiff to enable a user associated with the oral health device from attaching the oral insert to the handle at the oral insert-handle interface.

The disclosed gasket has a variable stiffness. The disclosed gasket has a greater stiffness on a portion proximal to a fluid delivery system of the oral health device and a lesser stiffness on a portion distal to the fluid delivery system of the oral health device. This reduces the likelihood that the oral health device will leak pressurized fluid when activated.

Figure 1A:
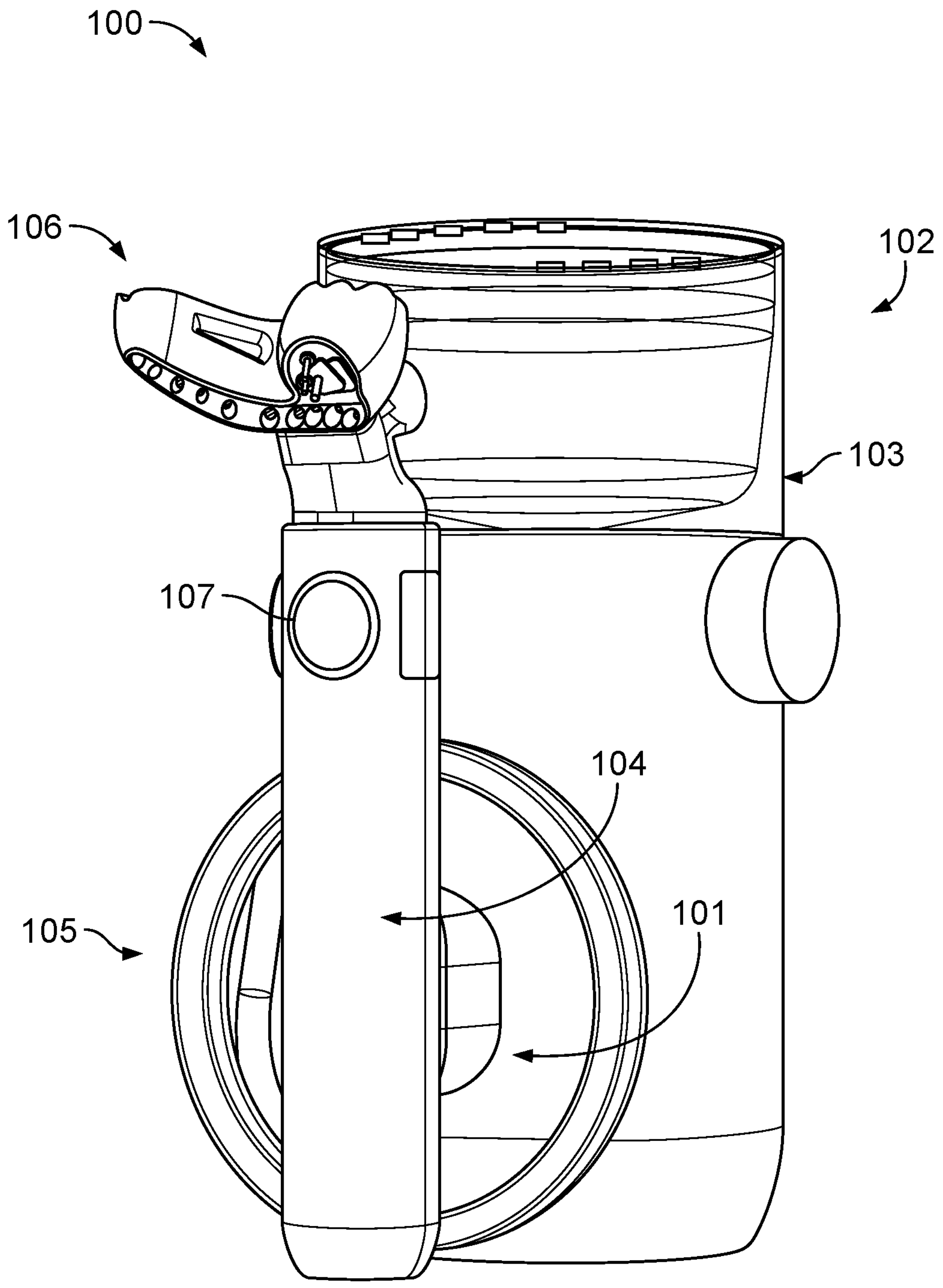
FIG. 1A is a diagram illustrating an oral health device for cleaning the oral anatomy of a user in accordance with some embodiments.

FIG. 1A is a diagram illustrating an oral health device for cleaning the oral anatomy of a user in accordance with some embodiments. In the example shown, device 100 includes an oral insert 106 and a fluid deliver system that includes a base station 102 having a fluid reservoir 103, a handle 104, and one or more fluid conduits or tubes 105 connecting fluid reservoir 103 to the handle 104. The handle 104 may comprise one or more control buttons 107 (e.g., a start/stop button, a fluid flow adjustment dial), as may be desirable, which may be positioned variously on the handle for ergonomic or efficient use. The fluid retained in the fluid reservoir of device 100 may be water, a medicant, saline, a mouth wash or rinse, (e.g., containing fluoride and/or germicidal or other cleaning and/or teeth protective fluids), and/or any other desirable additive.

The oral insert 106 is comprised of a plurality of fluid nozzles that are arranged in accordance with the unique geometry of the user's oral cavity, gingival geometry, and dental structures (and any oral and/or dental devices or implants). Examples of oral and/or dental devices or implants may include, but are not limited to, permanent and removable dental restorations/prosthetics, orthodontic appliances, and etc. (e.g., crowns, bridges, implants, braces, retainers, dentures, and the like). Each of the fluid nozzles (orifices) may be positioned to target a specific dental feature. Inside oral insert 106, the fluid nozzles may be connected to one or more internal manifolds. The inlets of these manifolds may extend from the back of the mouthpiece (or where desirable for ergonomic and/or efficient use) in the form of a standardized connector, to which a handle and/or one or more tubes may be connected.

Figure 1B:
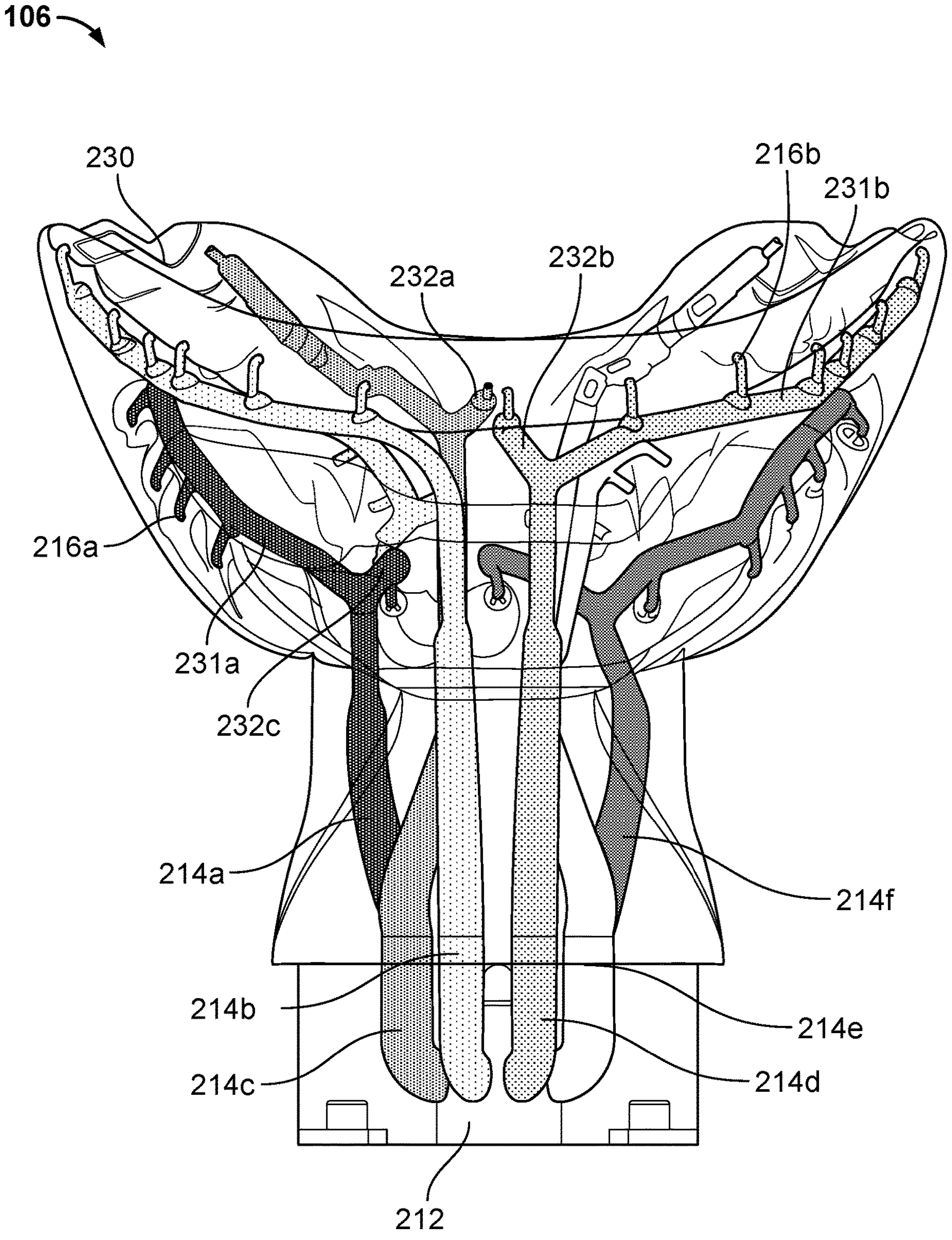
FIG. 1B depicts a schematic perspective view of a set of manifolds of an oral insert.

FIG. 1B depicts a schematic perspective view of a set of manifolds of an oral insert. The oral insert 106 may comprise a fluid inlet port 212 configured to receive fluid and a tray surface 230 configured to retain teeth (not shown). The set of manifolds 214*a*, 214*b*, 214*c*, 214*d*, 214*e*, 214*f* are configured to receive fluid from the fluid inlet port 212. Each manifold may comprise one or more trunks, such as trunks 231*a*, 231*b* and branches extending from a trunk, such as branches 232*a*, 232*b*, 232*c*. Fluid nozzles, such as fluid nozzles 216*a*, 216*b* may be coupled to respective trunks and branches. In some variations, the set of manifolds 214*a*, 214*b*, 214*c*, 214*d*, 214*e*, 214*f* may extend from the fluid inlet port 212 on either side of a lateral plane bisecting the central incisors (not shown). Directly connecting the trunk to the fluid nozzles corresponding to the central incisors may generate a hydraulically inefficient tortuous path for the trunk. Therefore, in some variations, a branch may be used to couple one or more of the anterior fluid nozzles to the trunk. In FIG. 1B, branches 232*a*, 232*b*, 232*c* extend toward fluid nozzles 216*a*, 216*b*, 216*c* corresponding to the anterior teeth (e.g., central incisors).

Figure 2:
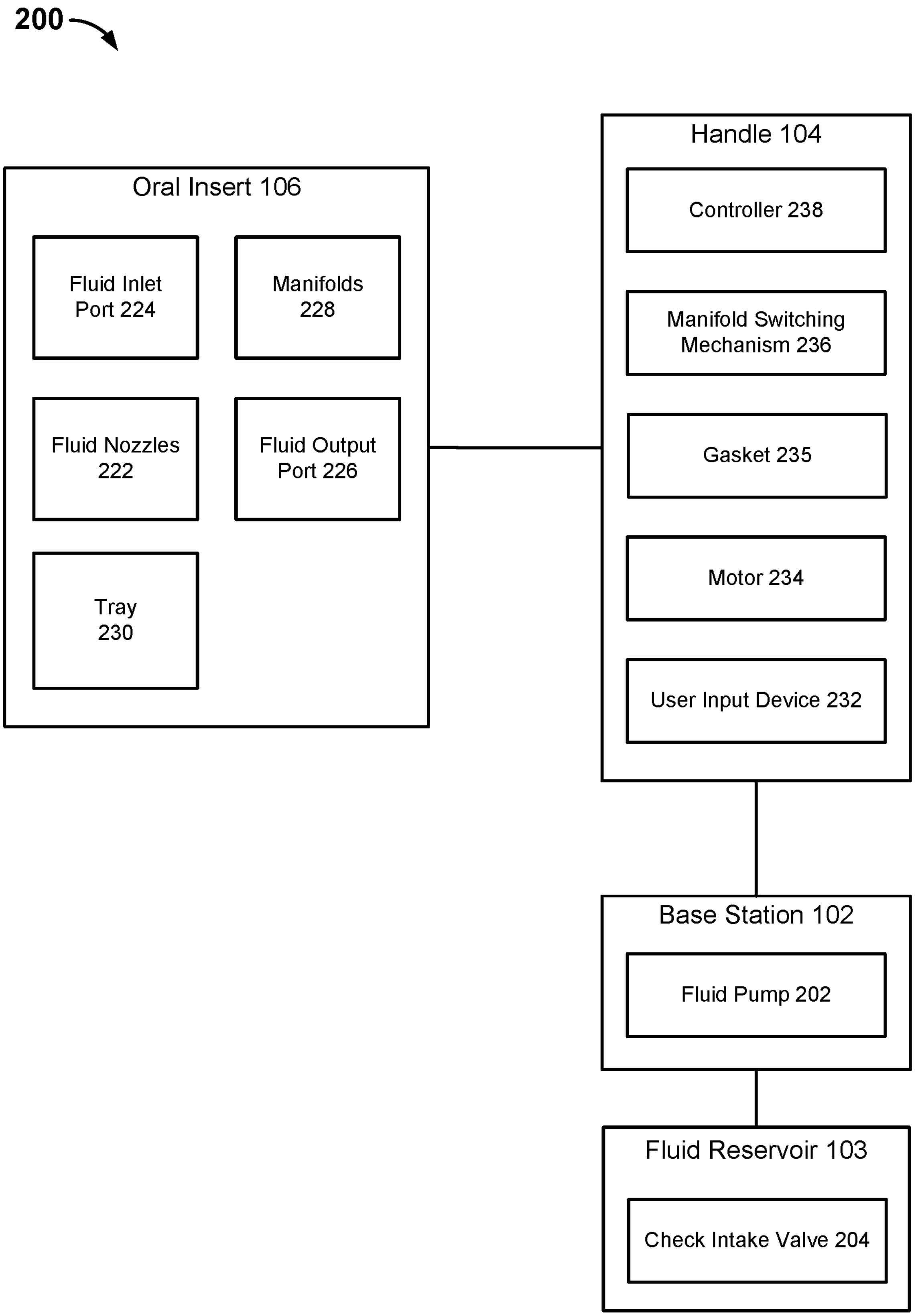
FIG. 2 is a block diagram illustrating an oral health device in accordance with some embodiments.

FIG. 2 is a block diagram illustrating an oral health device in accordance with some embodiments. Device 200 includes an oral insert 106 coupled to a fluid delivery system comprised of handle 104, fluid reservoir 103, and base station 102. Fluid reservoir 103 is releasably engaged to a base station 102. Base station 102 is releasably engaged to handle 104. Handle 104 is releasably engaged to oral insert 106 at an oral insert-handle interface.

Fluid reservoir 103 includes a check intake valve 204. In some embodiments, check intake valve 204 is located off-centered from a bottom surface of fluid reservoir 103. In some embodiments, check intake valve 204 is located at a center of the bottom surface of fluid reservoir 103.

Base station 102 includes fluid pump 202. Fluid pump 202 is configured to output pressurized fluid from fluid reservoir 103 to oral insert 106 via handle 104. The fluid retained in fluid reservoir 103 may be water, a liquid medicant, saline, a mouth wash or rinse, (e.g., containing fluoride and/or germicidal or other cleaning and/or teeth protective fluids), and/or any other desirable additive, a brushing agent, and/or a chemical agent. Fluid pump 202 is configured to output pressurized fluid such that a flow rate of the pressurized fluid at each of the fluid nozzles 202 is the same flow rate within a predetermined tolerance. To provide an oral care treatment having a particular efficacy, fluid pump 202 is configured to provide a particular flow rate of fluid having a particular amount of pressure.

Handle 104 includes user input device 232. User input device 232 (e.g., a button, a switch, etc.) is configured to turn on/off motor 234 and fluid pump 202 in response to a user input. Manifold switching mechanism 236 includes a planetary gear carrier, a manifold selector disc, a low friction material, and a manifold disc. When in an "on" state, motor 234 is configured to cause a sun gear of the planetary gear carrier to rotate (clockwise or counterclockwise). The planetary gears of the planetary gear carrier are coupled to the manifold selector disc. The gears of the planetary gear carrier are configured to rotate when the sun gear of the planetary gear carrier rotates. As a result, the manifold selector disc also rotates. The rate at which the manifold selector disc rotates is based on a gear ratio associated with the planetary gear carrier and rotational speed of the motor 234.

The manifold disc is comprised of a plurality of holes. The plurality of holes is arranged in a circular pattern. In some embodiments, the plurality of holes is arranged in a different pattern. The holes may be a circle, rectangle, triangle, or other type of shape. Each hole corresponds to one of the manifolds 228 of oral insert 106. The manifold selector disc includes an opening having a shape and dimensions such that when one of the holes of the manifold disc is selected, the other non-selected holes of the manifold disc are not visible from the opening. In the "on" state, fluid is provided from fluid reservoir 103 to one of the manifolds 228 via the selected hole of the manifold disc. The configuration of the manifold switching mechanism 236 may prevent fluid from accidentally being introduced into the other manifolds via the other non-selected holes. The pressurized fluid causes a force to be applied on the manifold selector disc in a direction towards the manifold disc. A low friction material is situated between the manifold disc and the manifold selector disc. The low friction material reduces friction between the manifold disc and the manifold selector disc, and enables motor 234 to rotate the manifold selector disc via the planetary gear carrier.

Device 200 may be in a "cleaning" phase or a "transition" phase during a cleaning cycle of device 200. During the "cleaning" phase, one of the manifolds 228 is selected and an opening of the manifold selector disc exposes a first hole of the manifold disc that corresponds to the selected manifold. Fluid pump 202 causes pressurized fluid to be provided from fluid reservoir 103 and delivered to the selected manifold via handle 104. The pressurized fluid is provided to a user's mouth via the plurality of fluid nozzles that are associated with the selected manifold. Device 200 may be programmed to be in the "cleaning" phase for a particular amount of time (e.g., 1 second). In some embodiments, motor 234 causes the manifold selector disc to continuously rotate during the "on" state and the opening of the manifold selector disc is temporarily aligned with a hold of the manifold disc as the manifold selector disc rotates.

Motor 234 causes the manifold selector disc to continuously rotate during the "on" state and during the "transition" phase, motor 234 causes the manifold selector disc to rotate exposing a portion of the first hole of the manifold disc and a portion of a second hole of the manifold disc. Device 200 is in the "transition" phrase until the second hole of the manifold disc is completely exposed and the other holes of the manifold disc are completely covered. In some embodiments, device 200 may be programmed to be in the "transition" phase for a particular amount of time (e.g., 0.10 seconds).

Fluid is continuously provided by fluid pump 202 to handle 104 when device 200 is turn on until device 200 is turned off or until there is no longer any more fluid in fluid reservoir 103. In some embodiments, motor 234 is coupled to controller 238 that causes motor 234 to rotate according to the programmed "cleaning" and "transition" phases. In some embodiments, a rotational speed of the motor is the same during the "cleaning" phase and the "transition" phase. In some embodiments, a rotational speed of the motor is different during the "cleaning" phase and the "transition" phase. In some embodiments, device 200 is programmed to perform a cleaning process in less than a particular amount of time (e.g., 8 seconds), that is, each of the holes of the manifold disc have been completely exposed by the manifold selector disc at some point in time during the cleaning process.

Because oral insert 106 and handle 104 are not constructed as a single unit, the oral insert-handle interface is a potential location for fluid to leak from is releasably engaged to oral insert 106 at an oral insert-handle interface and not constructed as a single unit, the oral insert-handle interface is one potential location for fluid to leak from device 200. Handle 200 includes gasket 235. Gasket 235 has a variable stiffness. Gasket 235 has a greater stiffness on a portion proximal to manifold switching mechanism 236 and a lesser stiffness on a portion distal to the manifold switching mechanism 236. This reduces the likelihood that device 200 will leak pressurized fluid when activated.

The fluid structures defined by the oral insert 106 may comprise a fluid inlet port 224, a set of manifolds 228, a set of fluid nozzles 222, and a fluid outlet port (e.g., effluence port) 226. The oral insert 106 may define a tray 230 configured to retain teeth (e.g., upper teeth, lower teeth). The tray 230 may be configured such that at least a portion of the tray 230 corresponds to a shape of the user's teeth.

Oral insert 106 is configured to receive fluid from the fluid reservoir 103 at fluid inlet port 224. Fluid inlet port 224 is configured to be in fluid communication with the set of manifolds 228 and the set of nozzles 222. In one embodiment, oral insert 106 includes a set of 8 manifolds where each manifold includes 8 fluid nozzles. Fluid output from the set of nozzles 222 may be directed at the user's oral anatomy, for example, through the interproximal spaces between the teeth. A nozzle may be positioned at any location on a manifold. However, the nozzle position is specific to the oral structure of a user. After the fluid passes through and/or irrigates the user's oral anatomy, the fluid may then be guided to the fluid outlet port 226 to exit the user's oral cavity. In some variations, fluid may flow sequentially into fluid inlet 224 and through the set of manifolds 228 and their respective nozzles 222. The set of nozzles 222 may be configured to output fluid toward oral anatomy. Fluid outlet port 226 may then receive the fluid (e.g., effluence) and channel it away from the oral anatomy.

Figure 3A:
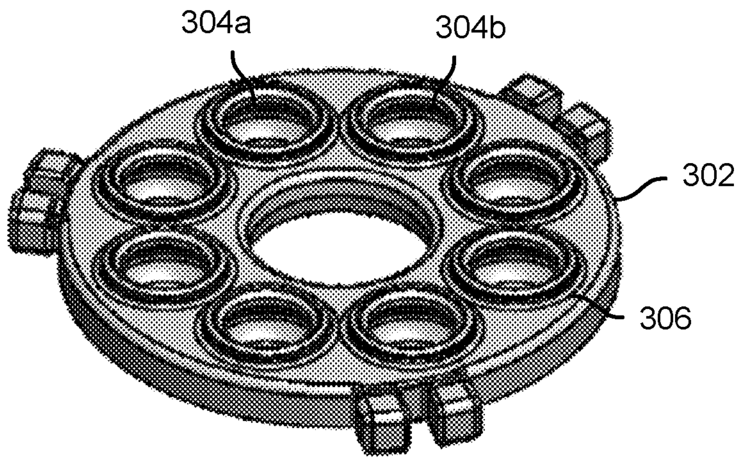
FIG. 3A is a perspective view of a gasket in accordance with some embodiments.
Figure 3B:
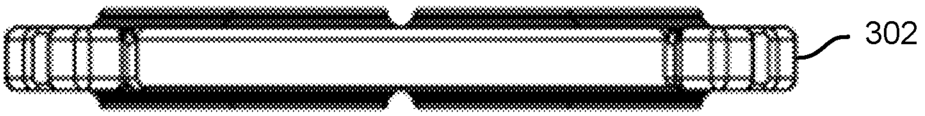
FIG. 3B is a side view of a gasket in accordance with some embodiments.
Figure 3C:
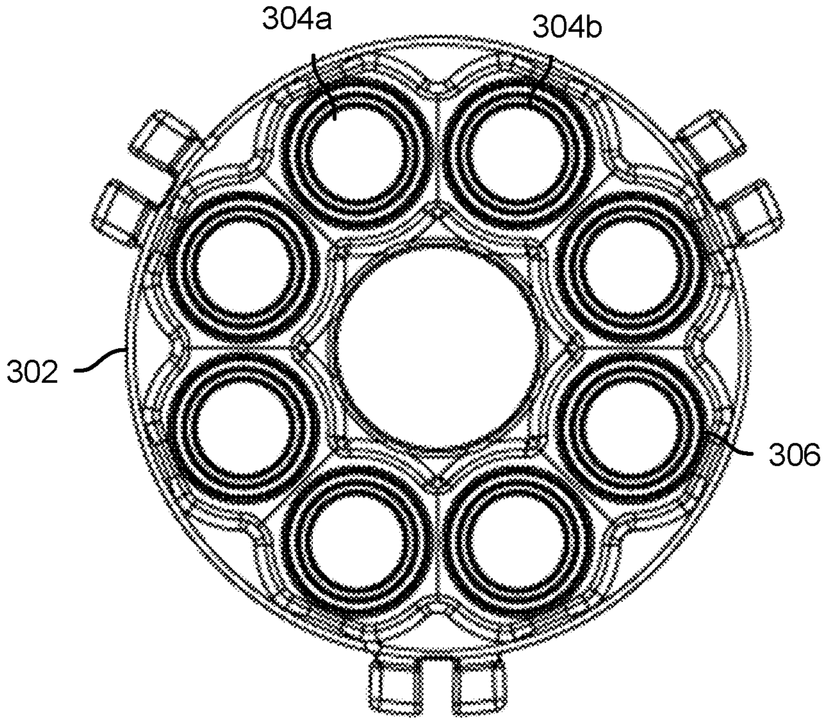
FIG. 3C is a top-down view of a gasket in accordance with some embodiments.

FIG. 3A is a perspective view of a gasket in accordance with some embodiments. FIG. 3B is a side view of a gasket in accordance with some embodiments. FIG. 3C is a top-down view of a gasket in accordance with some embodiments. In the example shown, gasket 302 includes a plurality of holes, such as holes 304*a*, 304*b*. In some embodiments, gasket 302 includes eight holes. Although FIGS. 2A-2B depict gasket 302 as having eight holes, gasket 302 may have n holes. Each of the holes corresponds to one of the manifolds associated with oral insert 106. A hole is surrounded by a ring, such as ring 306. A ring is configured to mate with a port corresponding to a manifold associated with oral insert 106.

Gasket 302 has a variable stiffness. Gasket 302 has a greater stiffness on a top portion of gasket 302 than a bottom portion of gasket 302. In some embodiments, the bottom portion of gasket 302 has a first stiffness and the top portion of gasket 302 has a second stiffness. In some embodiments, the stiffness of gasket 302 decreases linearly from a first stiffness at a bottom portion of gasket 302 to a second stiffness at a top portion of gasket 302. In some embodiments, the stiffness of gasket 302 decreases non-linearly from a first stiffness at a bottom portion of gasket 302 to a second stiffness at a top portion of gasket 302.

Figure 4A:
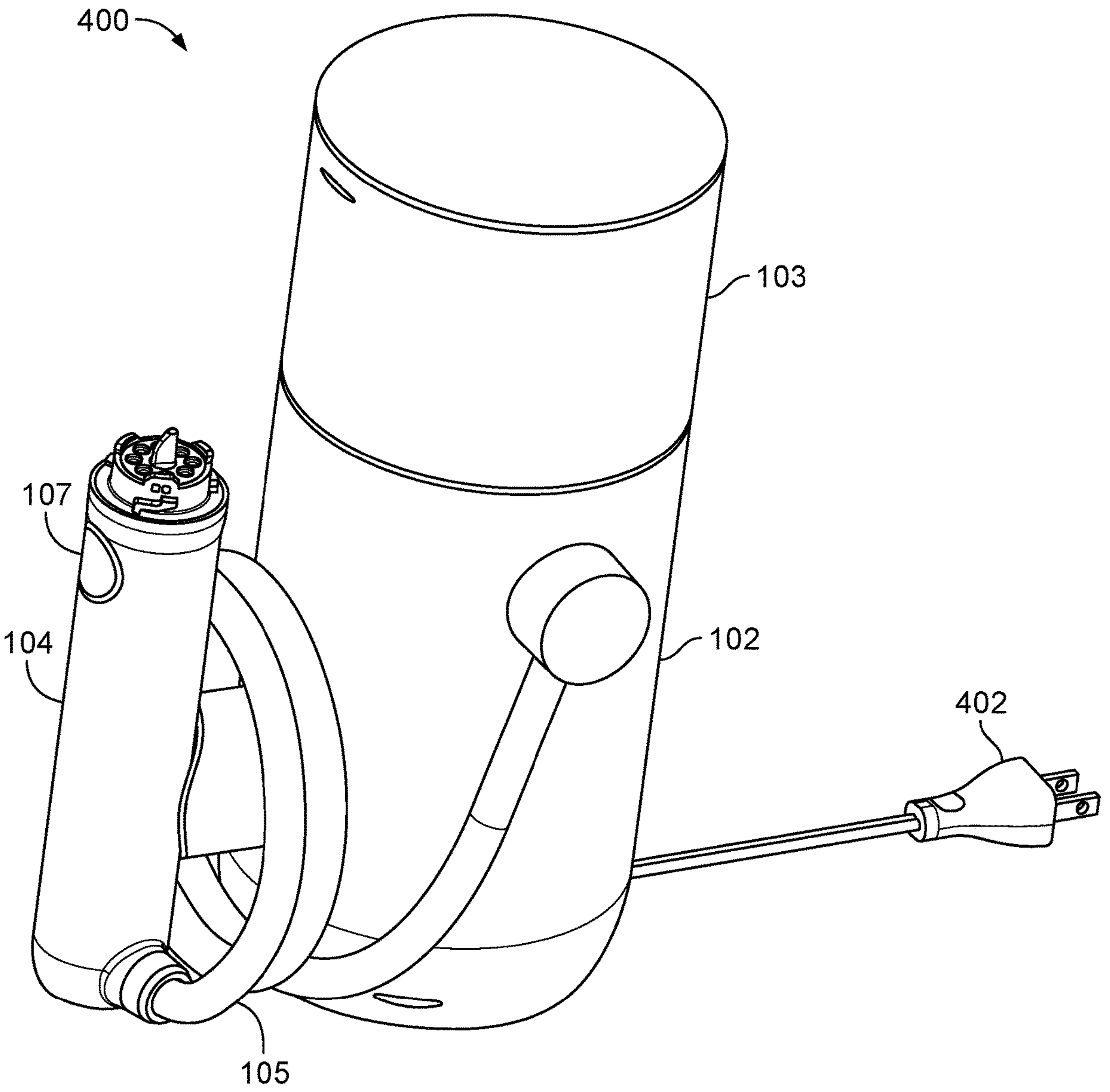
FIG. 4A is a perspective view of a fluid delivery system in accordance with some embodiments.

FIG. 4A is a perspective view of a fluid delivery system in accordance with some embodiments. In the example shown, fluid delivery system 400 includes handle 104, base 102, fluid reservoir 103, and conduit 105. Fluid delivery system 400 includes a power plug 402 that activates the oral health device in response to receiving a user input via control button 107.

Figure 4B:
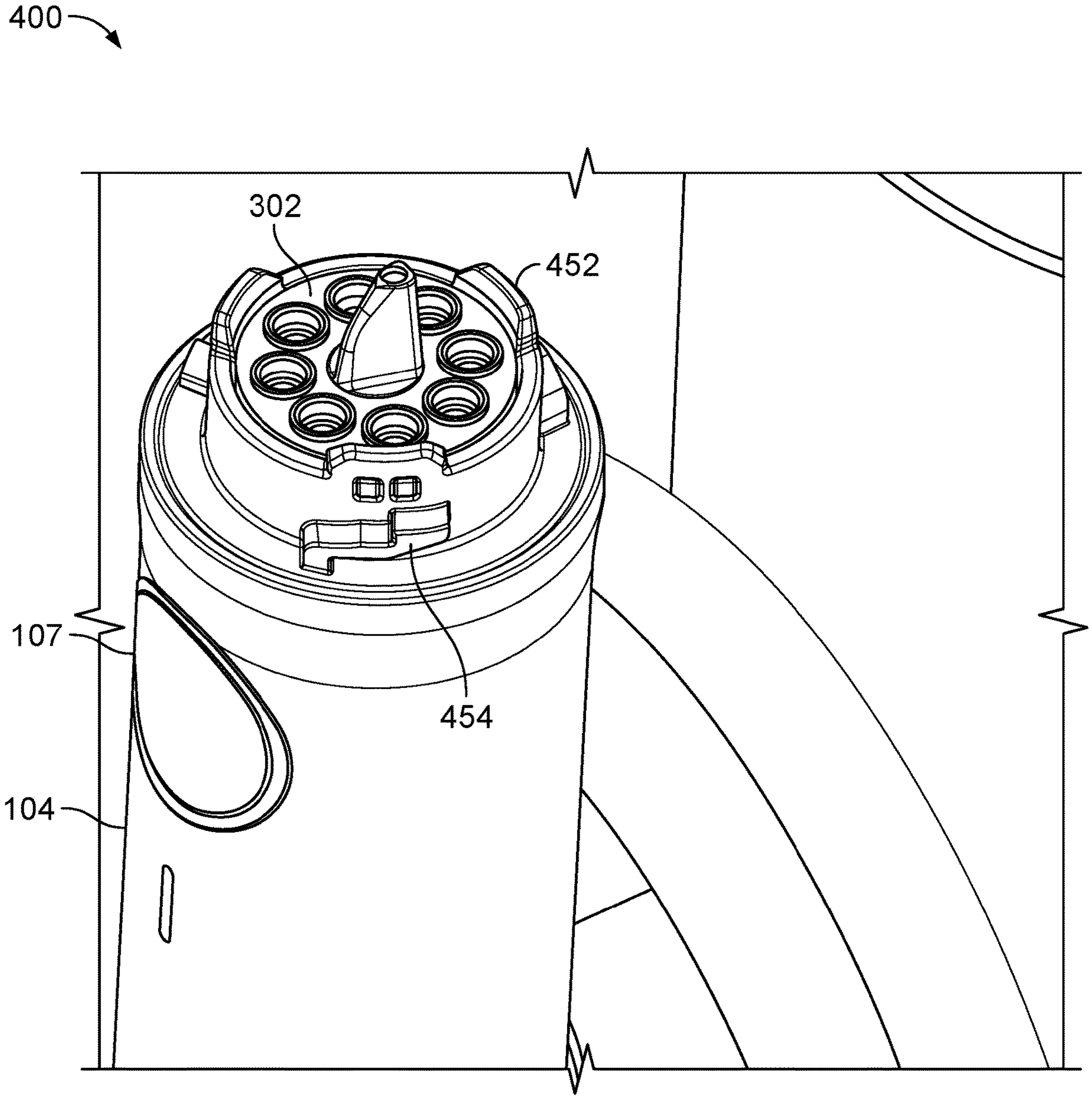
FIG. 4B is a perspective view of a fluid delivery system in accordance with some embodiments.

FIG. 4B is a perspective view of a fluid delivery system in accordance with some embodiments. In the example shown, handle 104 includes a handle manifold 452 positioned below gasket 302. Handle manifold 452 includes a plurality of latches, such as latch 454.

Figure 5A:
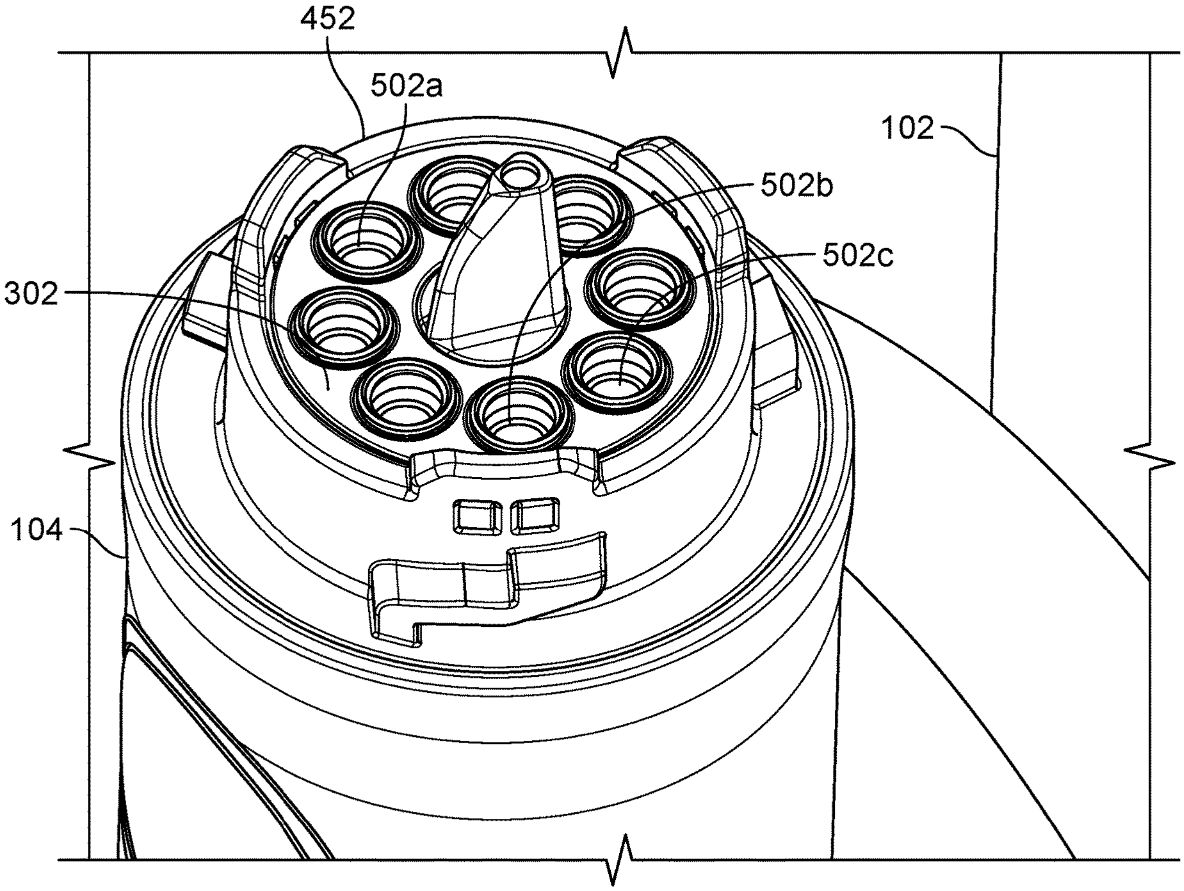
FIG. 5A is a perspective view of a handle in accordance with some embodiments.

FIG. 5A is a perspective view of a handle in accordance with some embodiments. In the example shown, handle 104 includes a handle manifold 352 on which gasket 302 is located. Gasket 302 includes a plurality of holes. Handle manifold 452 also includes a plurality of holes, such as 502*a*, 502*b*, 502*c*. The number of holes associated with gasket 302 is equal to the number of holes associated with handle manifold 452. A hole from gasket 302 aligns with one of the holes of handle manifold 452.

Figure 5B:
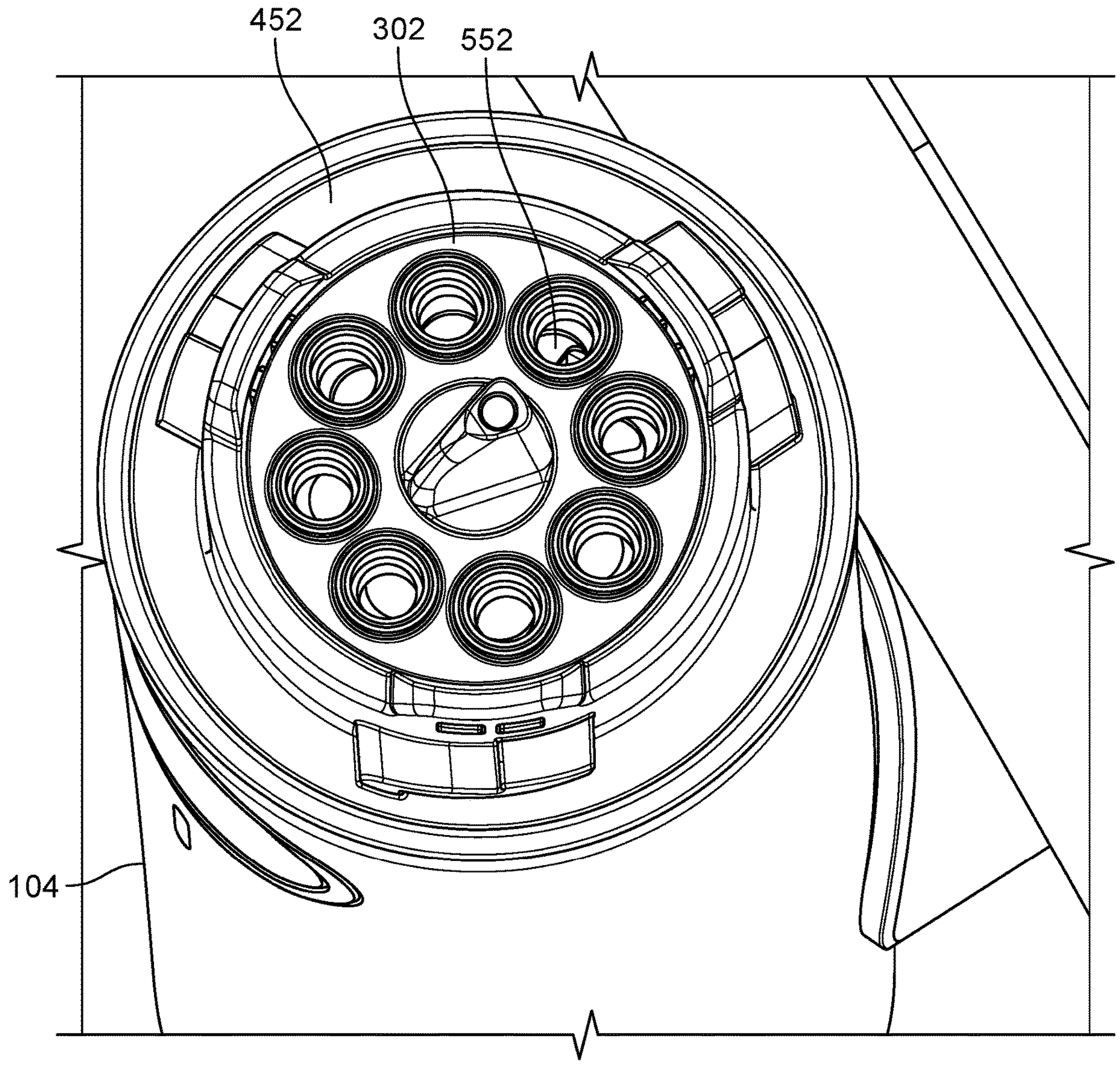
FIG. 5B is a perspective view of a handle in accordance with some embodiment.

FIG. 5B is a perspective view of a handle in accordance with some embodiment. In the example shown, handle 104 includes a handle manifold 452 on which gasket 302 is located. Gasket 302 includes a plurality of holes. Each hole of gasket 302 corresponds to one of the holes associated with handle manifold 452. A manifold selector disc 552 is located below handle manifold 452. Manifold selector disc 552 is coupled to a motor (not shown). The motor causes manifold selector disc 552 to rotate. Manifold selector disc 552 includes an opening.

The opening of manifold selector disc 552 is selectively aligned with the holes of handle manifold 452 and gasket 302 such that it exposes one of the plurality of holes associated with handle manifold 452 and gasket 302, and covers the other holes associated with handle manifold 452 and gasket 302. Each of the plurality of holes of handle manifold 452 and gasket 302 is associated with a corresponding manifold of an oral insert of the oral health device. Pressurized fluid is provided to handle 104 to oral insert 106 via the opening of manifold selector disc 552 and an exposed hole associated with handle manifold 452 and gasket 302. The pressurized fluid ultimately arrives at a plurality of fluid nozzles associated with the manifold of the oral insert that corresponds to the exposed hole.

The pressurized fluid may generate an eddy current that causes gasket 302 to be pulled towards handle manifold 452. This may cause a small gap to appear at the oral insert-handle interface. As a result, fluid may leak at the oral insert-handle interface. However, the likelihood of fluid leaking at the oral insert-handle interface is reduced due to gasket 302 having a variable stiffness. This creates a good seal at the oral insert-handle interface and minimizes the ability of the pressurized fluid to generate an eddy current.

Figure 5C:
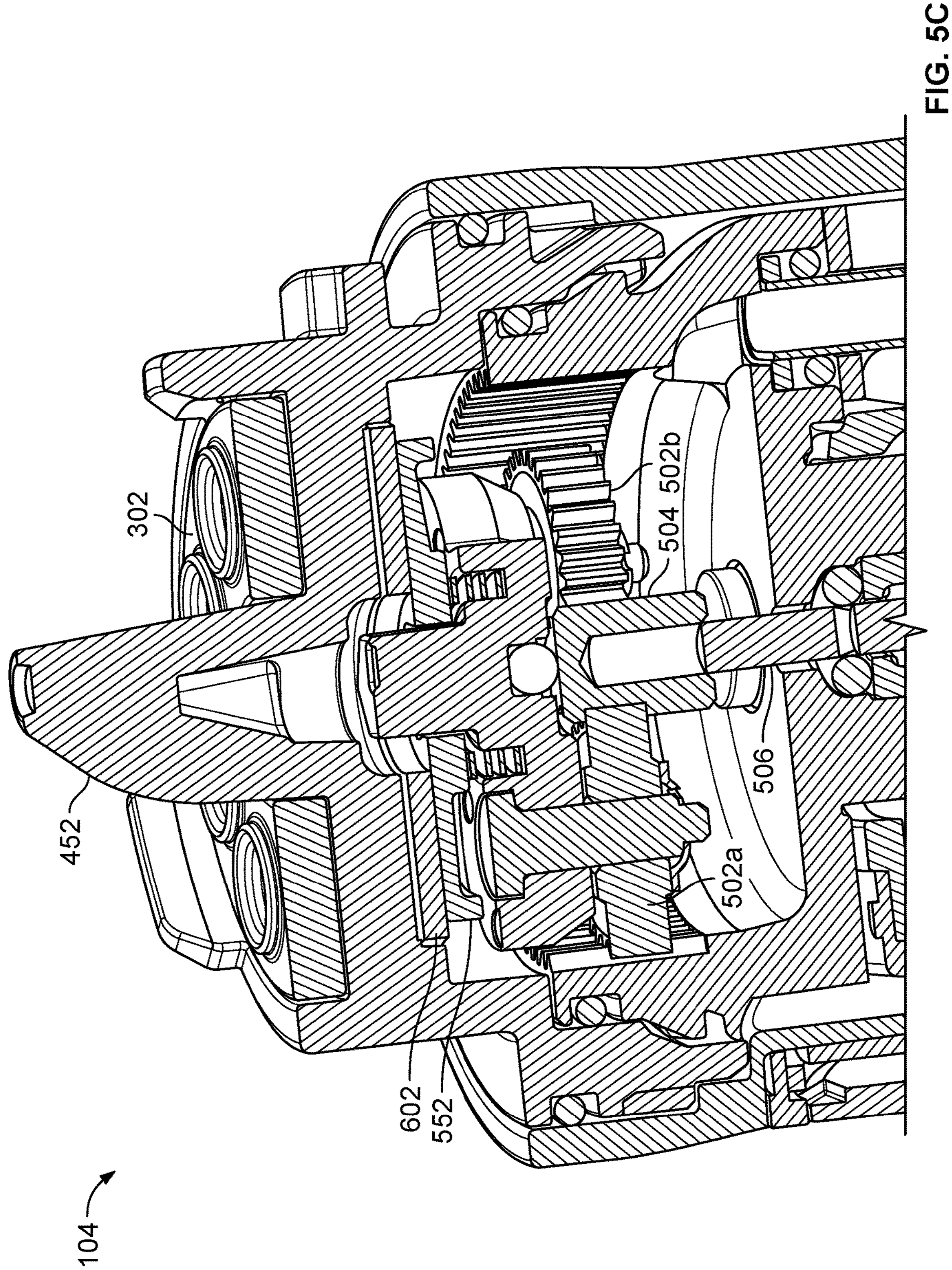
FIG. 5C is a cross-sectional view of a handle in accordance with some embodiments.
Figure 6:
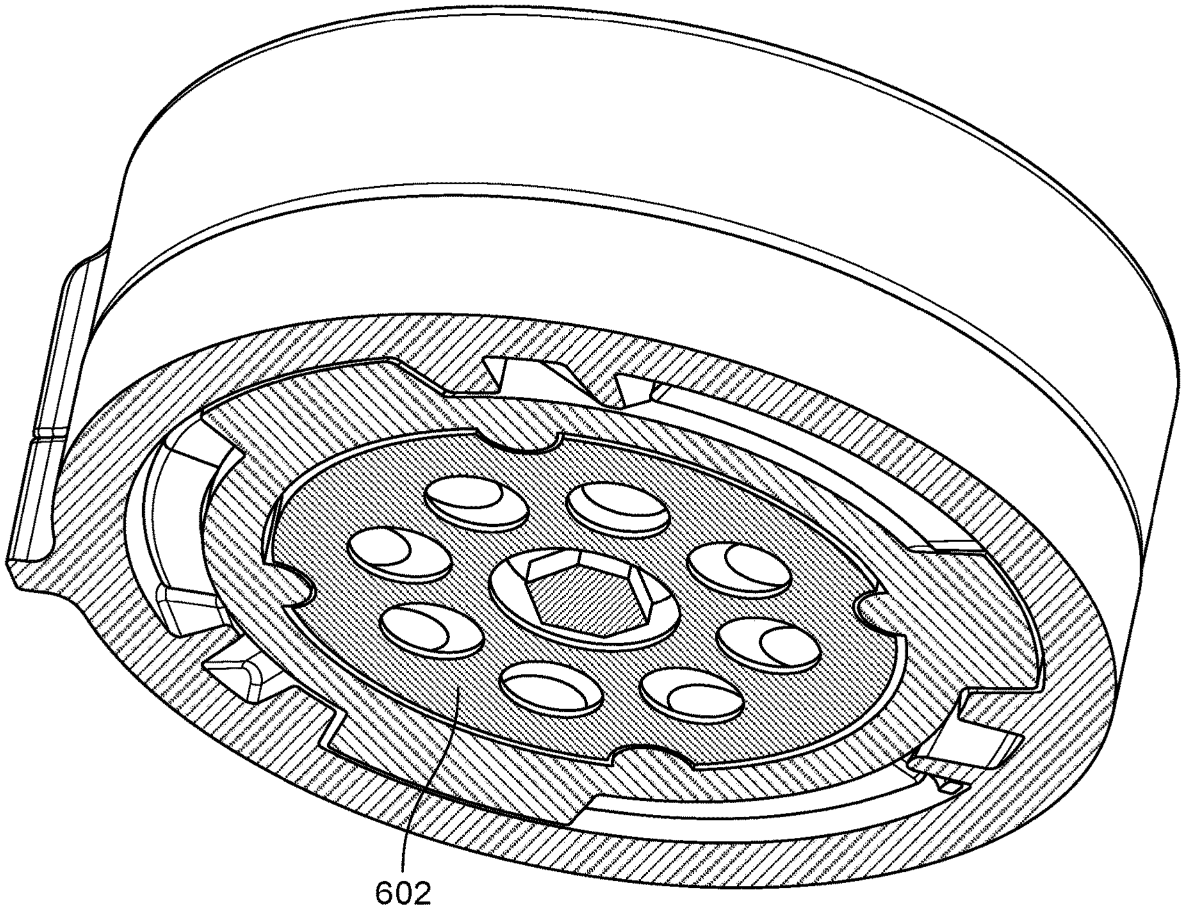
FIG. 6 is a diagram illustrating a low friction material in accordance with some embodiments.

FIG. 5C is a cross-sectional view of a handle in accordance with some embodiments. In the example shown, handle 104 includes a handle manifold 452 and a gasket 302. Gasket 302 is located on top a portion of handle manifold 452. In between handle manifold 452 and manifold selector disc 552 is low friction material 602 (e.g., a material having a friction coefficient less than a threshold value). Examples of low friction material 602 include, but are not limited to, POM (PolyOxyMethylene), POM-C (Acetal Copolymer), or POM-H (Delrin). As seen in FIG. 6, the low friction material 602 includes a same number of holes as gasket 302 and handle manifold 452.

Manifold selector disc 552 is coupled to a motor (not shown) via a planetary gear carrier. The planetary gear carrier includes a sun gear 504 and a plurality of planet gears, such as planet gears 502*a*, 502*b*. The planetary gear carrier may include 2: n planet gears. In one embodiment, the planetary gear carrier includes three planet gears. The sun gear 504 is coupled to the motor via motor shaft 506. The motor is configured to cause the sun gear 504 to rotate. The planet gears are coupled to the manifold selector disc 552. When the sun gear 504 rotates, the planet gears cause manifold selector disc 552 to rotate.

Pressure causes a force to be applied on the manifold selector disc 552 in a direction towards the handle manifold 452. Such pressure may prevent the manifold selector disc 552 from rotating. However, low friction material 602 is located in between the manifold selector disc 552 and the handle manifold 452 to enable the manifold selector disc 552 to rotate when the oral health device is turned on.

Figure 7:
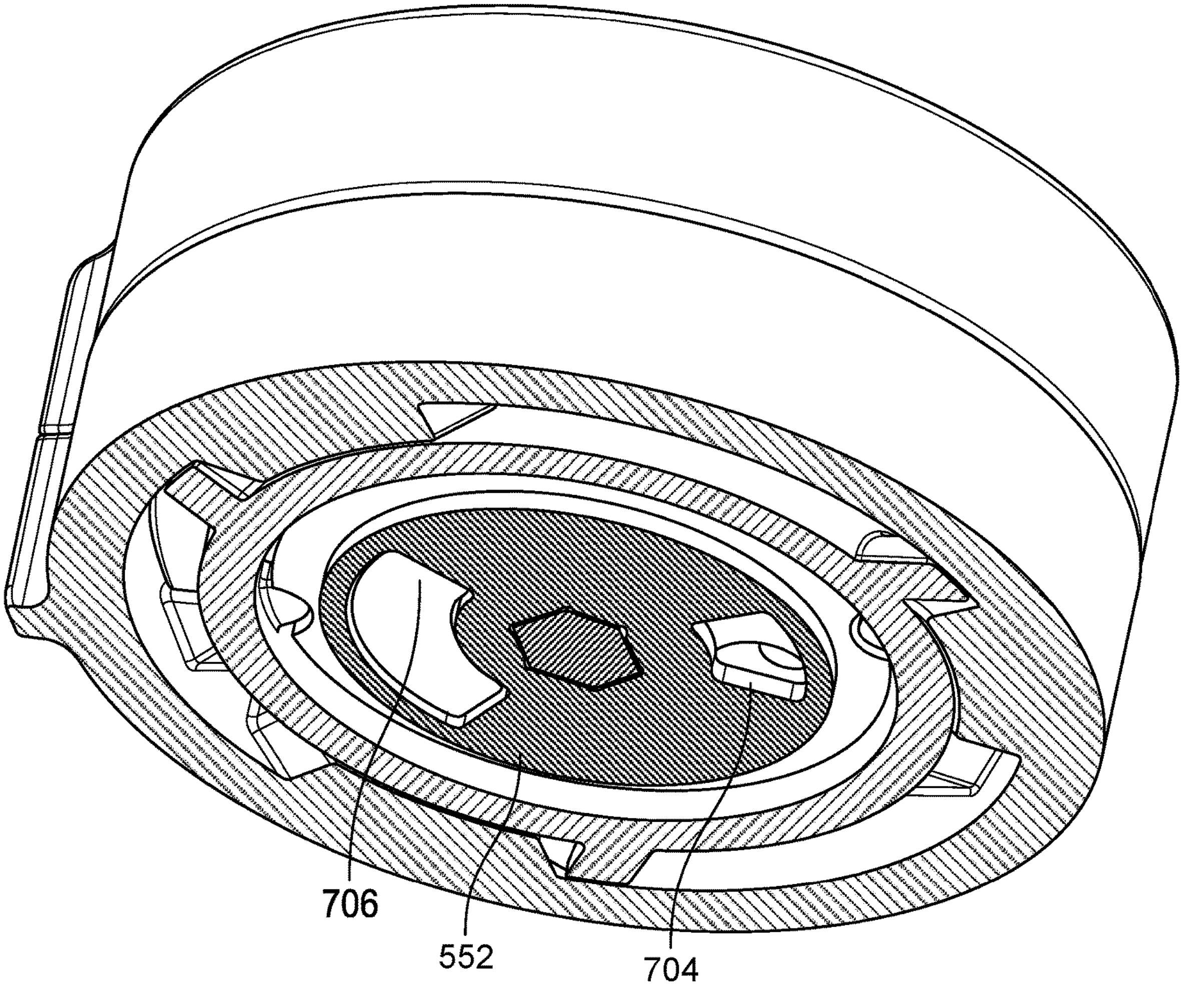
FIG. 7 is a diagram illustrating the manifold selector disc in accordance with some embodiments.
Figure 8A:
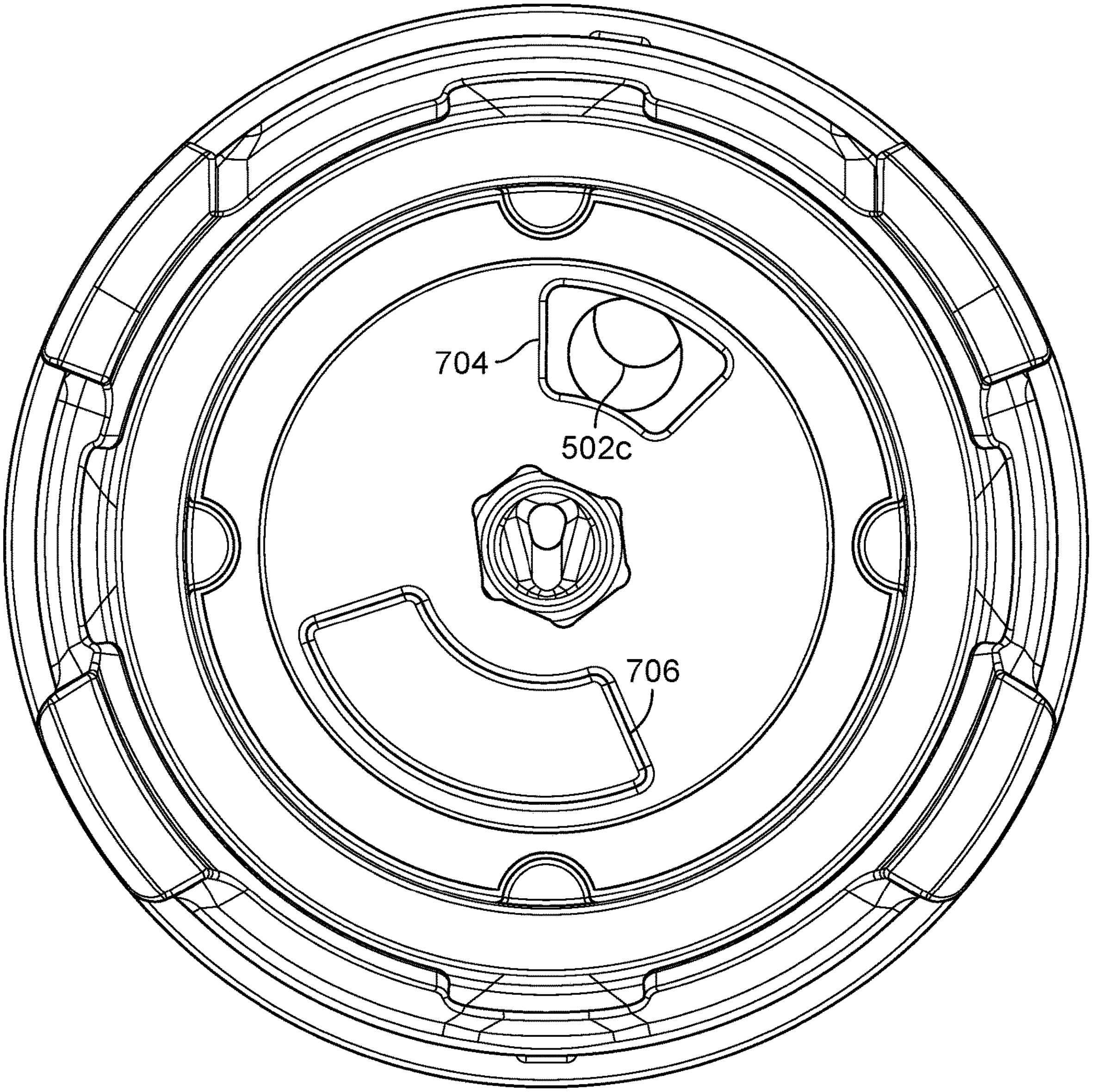
FIG. 8A illustrates a manifold selector disc in a first position in accordance with some embodiments.
Figure 8B:
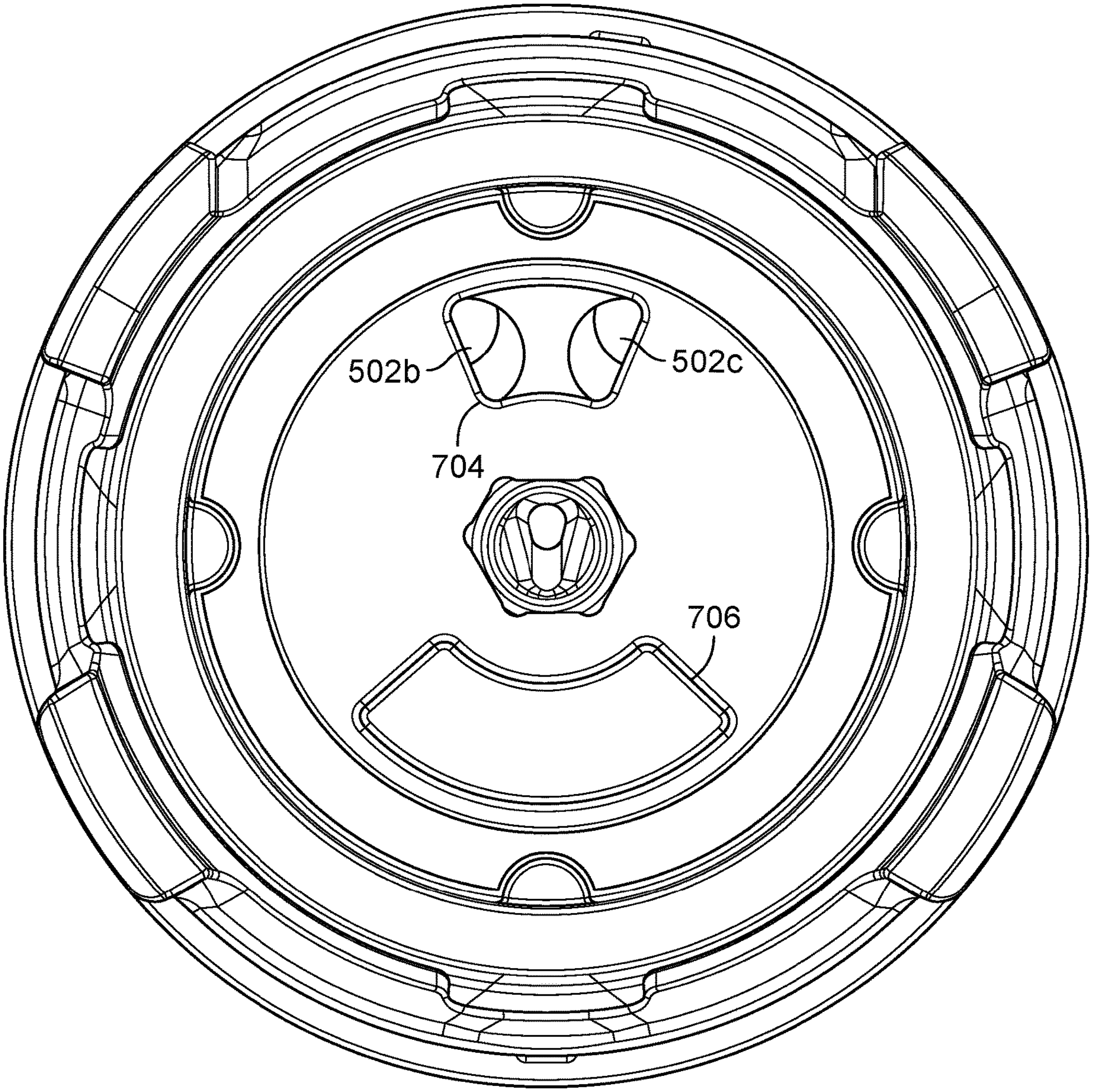
FIG. 8B illustrates the manifold selector disc transitioning from the first position to the second position in accordance with some embodiments.

FIG. 7 is a diagram illustrating the manifold selector disc in accordance with some embodiments. In the example shown, the manifold selector disc 552 includes an opening 704 (also referred to as a "gateway"). In the example shown, opening 704 has a trapezoidal shape. Opening 704 may have other shapes (e.g., circle, square, rectangle, pentagon, etc.). As seen in FIG. 8A, opening 704 has size and dimensions such that only one of the holes (hole 502*c*) of the handle manifold 452 is exposed when the manifold associated with the hole is selected. A corresponding hole associated with gasket 302 is also exposed. When transitioning between a first manifold associated with oral insert 106 and a second manifold associated with oral insert 106, as seen in FIG. 8B, opening 704 is configured to expose a portion of a first hole of handle manifold 452 (hole 502*c*) and a portion of a second hole of handle 452 (hole 502*b*). Corresponding portions of holes associated with gasket 302 are also exposed.

Manifold selector disc 552 includes a rotation balancing cutout 706. The rotation balancing cutout 706 is located antipodal (diametrically opposite) to the opening 704. The rotation balancing cutout 706 has a volume that is substantially equal (within a threshold tolerance) of the volume of opening 704. This is to ensure that the manifold selector disc 552 is balanced (e.g., prevent wobble, reduce vibration) when the manifold selector disc 552 rotates. In some embodiments, rotation balancing cutout 706 has a thickness that is half a thickness of manifold selector disc 552. In other embodiments, the rotation balancing cutout 706 may have other thicknesses and dimensions, so long as the volume of the rotation balancing cutout 706 is substantially equal to the volume of opening 704.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An oral health device, comprising:

an oral insert including a plurality of manifolds for conveying fluid to nozzles in the oral insert; and a fluid delivery system including an interface that mates with the oral insert, wherein the interface includes a gasket having variable stiffness, wherein the variable stiffness is provided by a material property variation across the gasket, the gasket having a greater stiffness on a top portion of the gasket than a bottom portion of the gasket, wherein the top portion of the gasket is closer to the oral insert than the bottom portion of the gasket when the fluid delivery system is mated with the oral insert.

2. The oral health device of claim 1, wherein the gasket includes a first plurality of holes.

3. The oral health device of claim 2, wherein a hole of the first plurality of holes corresponds to one of the plurality of manifolds associated with the oral insert.

4. The oral health device of claim 2, wherein each of the first plurality of holes is surrounded by a corresponding ring.

5. The oral health device of claim 4, wherein the corresponding ring of each of the plurality of holes is configured to mate with the oral insert at the interface.

6. The oral health device of claim 2, wherein the gasket is located on top of a handle manifold associated with the fluid delivery system.

7. The oral health device of claim 6, wherein the handle manifold includes a plurality of latches to which the oral insert attaches.

8. The oral health device of claim 6, wherein the handle manifold includes a second plurality of holes.

9. The oral health device of claim 8, wherein a first hole of the first plurality of holes corresponds to a first hole of the second plurality of holes.

10. The oral health device of claim 1, wherein the bottom portion of the gasket has a first stiffness and the top portion of the gasket has a second stiffness.

11. The oral health device of claim 1, wherein a stiffness of the gasket decreases linearly from a first stiffness at the bottom portion of the gasket to a second stiffness at the top portion of the gasket.

12. The oral health device of claim 1, wherein a stiffness of the gasket decreases non-linearly from a first stiffness at the bottom portion of the gasket to a second stiffness at the top portion of the gasket.

13. The oral health device of claim 1, wherein the fluid is water, a medicant, saline, a mouth wash, a rinse, an additive, a brushing agent, or a chemical agent.

14. The oral health device of claim 1, wherein the fluid delivery system further includes a handle that houses the gasket and a handle manifold located below the gasket.

15. The oral health device of claim 14, wherein the fluid delivery system further includes a fluid reservoir coupled to the handle.

16. The oral health device of claim 14, wherein the handle includes a manifold selector disc coupled to a motor.

17. The oral health device of claim 16, wherein the handle includes a low friction material located in between the handle manifold and the manifold selector disc.

18. The oral health device of claim 16, wherein the manifold selector disc is coupled to the motor via a planetary gear carrier and a shaft.

19. The oral health device of claim 16, wherein the manifold selector disc includes an opening.

20. The oral health device of claim 19, wherein the manifold selector disc includes a cutout that is opposite to the opening.

* * * * *